ns with inlet and outlet angles to tend to pull up the fuel from duct 22.

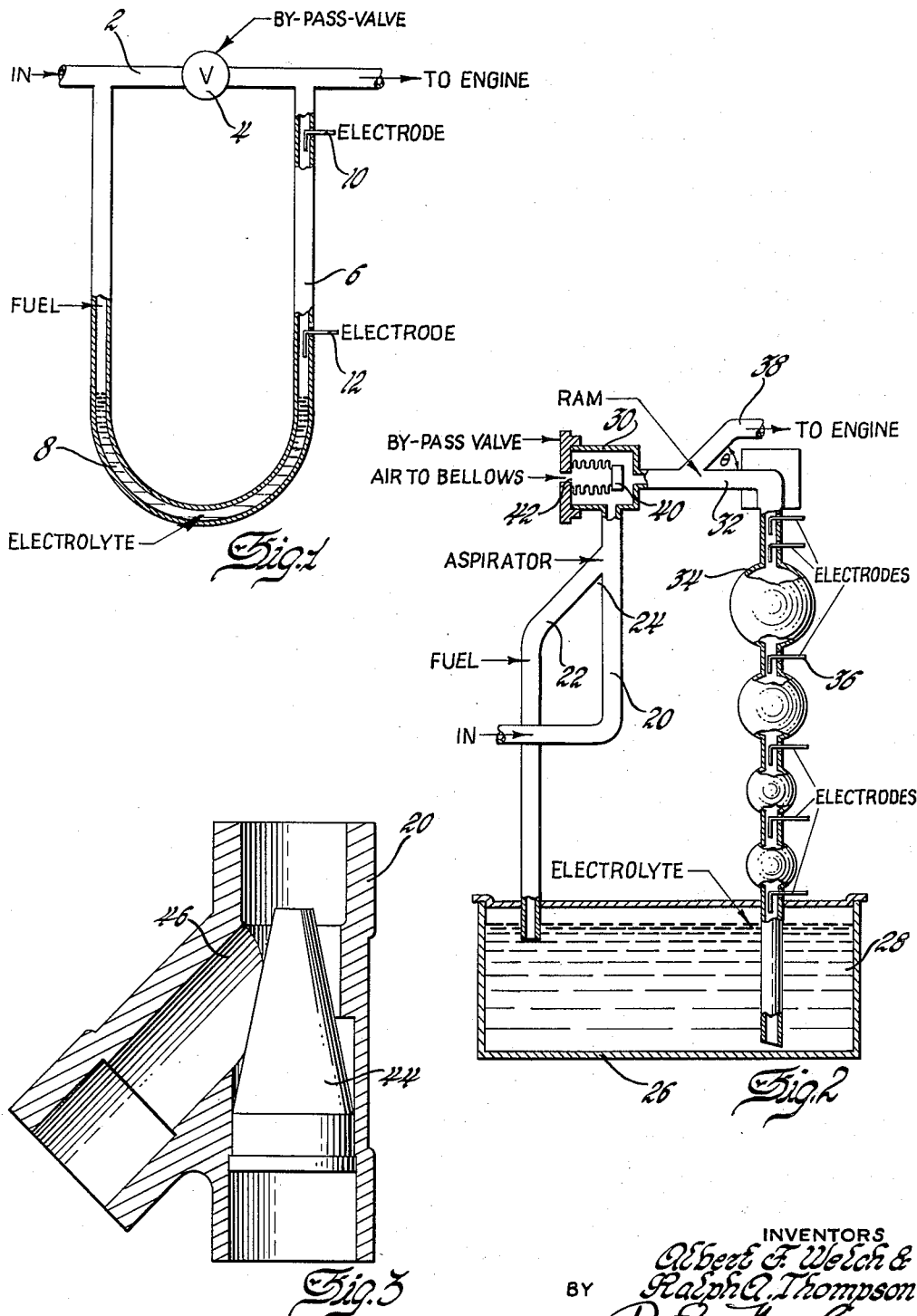

United States Patent Office
2,927,461
Patented Mar. 8, 1960

2,927,461
FUEL METERING SYSTEM

Albert F. Welch and Ralph A. Thompson, Detroit, Mich., assignors to General Motors Corporation, Detroit, Mich., a corporation of Delaware Application July 16, 1956, Serial No. 598,027

3 Claims. (Cl. 73—223)

This invention relates to fuel metering means and more specifically to liquid fuel metering means capable of operating at high rates of fuel consumption. Fuel measuring means have been utilized to test and study the performance of low rate and moderate rate consumption engines. This measuring means includes a measuring system in which a measured amount of fuel is stored in a direct bypass channel alternately switched in to supply fuel for maintaining continuous operation of the engine with periodic fuel measuring cycles. With this type of apparatus difficulty was experienced when attempts were made to measure fuel consumption on engines consuming fuel at a high rate.

It is therefore an object in making this invention to provide fuel consumption measuring means capable of operation at high rates of consumption.

It is a further object in making this invention to provide fuel measuring means which is capable of measuring fuel consumption at rates above 2500 cc. per minute.

It is a still further object to provide high flow rate fuel metering means.

With these and other objects in view which will become apparent as the specification proceeds, our invention will be best understood by reference to the following specification and claims and the illustrations in the accompanying drawings, in which:

Figure 1 is a diagrammatic showing of the principle of operation of the previous low flow rate fuel metering system;

Figure 2 is a diagrammatic showing of the high flow rate fuel metering means of our invention; and Figure 3 is an enlarged sectional view through the aspirator input connection.

In Figure 1 there is shown a straight duct or pipe 2 through which fuel may flow from a supply directly to an engine under test. The fuel is indicated as entering from the left and being fed out to the engine at the right. A valve 4 is provided in the duct 2 to control fuel flow. A U-shaped measuring section 6 is connected to the pipe 2 on both sides of the valve 4 through which fuel may flow when the control valve 4 is closed. An electrolyte 8 is supplied in the lower portion of the U-shaped section to complete electrical circuits with two electrodes 10 and 12 mounted in spaced relation in the right arm of the tube. Such a system is generally shown in a patent to Martin et al. 2,697,939, issued December 28, 1954, entitled Fuel Measuring System.

It is only necessary here to described the general operation of such a system. In non-metering phases of operation the fuel is fed into the left end of the duct 2 from a supply and out of the right end to the engine and the valve 4 is open. During this period the electrolyte 8 being heavier than the fuel assumes a balanced position as shown in the bottom of the U-shaped portion of the system extending up equal distances in the arms. The fuel flows in to fill both arms up to the level of duct 2. Since the fuel is a non-conductor of electricity, indicating circuits connected to electrode 10 and 12 are open.

If now the valve 4 is closed, fuel from the inlet at the left is forced down in the left arm of the U-shaped measuring means 6, forcing the electrolyte 8 up into the right arm and the fuel above it in the right arm out to the engine. When the electrolyte 8 contacts the electrode 12, a measuring cycle is initiated and when it continues to rise and reaches contact 10, the measuring cycle is terminated. Since the volume of the fuel between these two points is known, the fuel consumption can be calculated. Such a system is completely described in the Martin patent.

This system operates satisfactorily at low rates of fuel consumption, but when the fuel flow rate becomes high, it was found that the pressure drop across the control valve such as 4 was so high that the system could not be used. The result of the pressure drop across the top of the U-shaped section was to force fuel down into the left arm of the U and to suck it up out of the right arm, thus causing the electrolyte to shift around as though fuel were flowing out to be metered. As soon as this effect lifted the electrolyte far enough to contact electrode 12, the system of course would be of no use as the initiating contact of the cycle would be closed at all times, and it would be impossible to determine the beginning of a fuel metering phase.

In order to overcome these difficulties and to provide a high rate of flow metering system, that system shown in Figure 2 was designed. There are three main features: (1) the input to the measuring system has been changed to provide an aspirator action to tend to pull the fuel up out of the left arm instead of forcing it down; (2) the angle of the plumbing in the output has been changed to provide a ram action to tend to force the fuel down in the right arm; and (3) a different type of valve having less drop thereacross has been substituted in the direct main line. The U-shaped measuring system of Figure 1 is, of course, merely diagrammatic, the actual section being constructed of an inlet tube and a fuel measuring burette, both of which project down into a storage tank of the electrolyte. In Figure 2 the fuel is fed into a pipe 20 to which is affixed a second pipe 22, the two being joined together at an acute angle 24. Pipe 22 extends from the main line 20 down into a storage tank 26 in which a supply of electrolyte 28 is maintained. Main line 20 is also connected to a bypass valve 30 through which the fuel may flow to reach an output line 32. Line 32 is connected directly in line to the top of a fuel measuring burette 34 which contains a series of sections of known volumetric content together with spaced electrodes 36 connectible to indicating measuring apparatus. The lower end of the burette 34 likewise extends down into the electrolyte 28 in the tank 26. An output duct 38 is connected to line 32 at an angle and conveys fuel to the engine. The bypass valve 30 includes a closing member 40 which is seated to cut off the flow by air pressure entering through opening 42.

Figure 3 is an enlarged sectional view taken through the coupling between ducts 20 and 22 to illustrate the aspirator action of this connection. Line 20 proceeds directly through the connection and includes a hollow nozzle 44 to create a higher velocity at the end which is adjacent to the connection 46 applied to the duct 22. The flow of fluid straight through line 20 provides a normal aspirator action due to the acute angle of the connection of line 22 and this tends to suck up the fluid from line 22. The accelerating nozzle 44 creates a higher velocity and intensifies the aspirator action. Thus when fuel is fed in from the bottom of the coupling shown in Figure 3 and proceeds out of the top due to the nozzle 44 at an increased velocity, there will be a tendency for this pressure at the end of the nozzle to pull up any fuel that there may be in duct 22 at 46. Likewise as the fuel flows through the bypass valve 30 into duct 32 there is a tendency of the fuel to continue in a direct line into the top of the burette 34 and to force any fuel in the burette downwardly. This ram action is present whenever there is a change in direction of fuel flow and changes in magnitude with the angle of change. Thus, as the angle θ between lines 32 and 38 increases, the ram force tending to press downwardly on the fuel in burette 34 would increase. The amount of ram force needed for any given installation may be introduced.

During any portion of the cycle when fuel flows directly through the bypass valve 30 to the engine, this supplies engine operation and these two effects occur which tend to maintain the electrolyte in substantially level relationship and prevent it from flowing up the lower end of the burette to engage any of the electrodes erroneously. When the valve 30 is closed due to the application of air, the direct flow of fuel is cut off by member 40 and fuel then flows from line 20 through line 22, forcing the electrolyte down in the tank and up into the burette 34 to engage the electrodes and measure given fuel portions as the may lie in the different sections of the burette. The electrolyte flowing up into the burette, of course, forces out the fuel above to the engine through duct 38.

By the use of this configuration and the aspirator and ram actions, it has been possible to operate this fuel measuring system at very high rates of fuel consumption. For example, flows up to 10,000 cc. per minute have been obtained. This was the top limit of the fuel supply itself. There is no reason why higher magnitudes of flow cannot be obtained if desired.

We claim:

1. In a fuel measuring system for supplying fuel from a supply to consuming means comprising fuel conducting means for connecting the supply with the consuming means, flow controlling means mounted in the fuel conducting means to control the flow therethrough, a second flow conducting channel connected to the first and providing a flow path around the flow controlling means, said second channel including volume measuring means consisting of a body of immiscible liquid housed in said second flow conducting channel said immiscible liquid being heavier than the fuel and whose movement in said second channel displaces fuel and is indicative of volume of fuel displaced, said second channel being connected to the flow controlling means and making an angle of less than ninety degrees with the fuel conducting means at the input and an angle of greater than 90° to the fuel conducting means from the direction of fuel flow so as to provide a ram action at that point to adjust the position of the immiscible liquid and charge the second flow conducting channel with fuel as the fuel flows.

2. In a fuel measuring system for supplying fuel from a supply to consuming means comprising fuel conducting means for connecting the supply with the consuming means, flow controlling means mounted in the fuel conducting means to control the flow therethrough, a second flow conducting channel connected to the first at two spaced points on opposite sides of the flow controlling means and providing a flow path around the flow controlling means, said second channel including volume measuring means consisting of a body of immiscible liquid housed in said second flow conducting channel said immiscible liquid being heavier than the fuel and whose movement in said second channel displaces fuel and is indicative of volume of fuel displaced, said second channel being connected to the fuel conducting means at both ends, the end of the fuel conducting means connected to the fuel supply making such an angle with the second channel as to suck up or provide an aspiration action at the input end and the other or output end of the fuel conducting means making such an angle with the second channel as to force fluid into said second channel or provide a ram action to adjust the position of the immiscible liquid and charge the second channel with fuel as fuel flows through the fuel conducting means.

3. In a fuel measuring system for supplying fuel from a supply to consuming means having a main fuel line with a flow controlling means therein and a second flow conducting channel housing a body of immiscible electrically conductive liquid heavier than the fuel whose position in said second channel changes for measuring volume of fuel, the improvement consisting in connecting the ends of the second flow conducting channel to the main fuel line on opposite sides of the flow controlling means at acute and obtuse angles measured from the direction of flow to provide aspirator and ram action respectively at the connecting points, said second flow conducting channel providing a flow path around said flow controlling means, and spaced electrodes mounted in said second flow conducting channel engageable by said body of immiscible electrically conductive liquid as it is moved to provide a measurement of fuel quantities used.

References Cited in the file of this patent
UNITED STATES PATENTS

| | | |
|---|---|---|
| 1,410,013 | Huntley | Mar. 21, 1922 |
| 2,505,905 | McAfee | May 2, 1950 |
| 2,697,939 | Martin et al. | Dec. 28, 1954 |